Dec. 26, 1933.  J. C. CROWLEY  1,941,249
COMBINED INFLATING DEVICE AND PRESSURE GAUGE
Filed Oct. 5, 1932
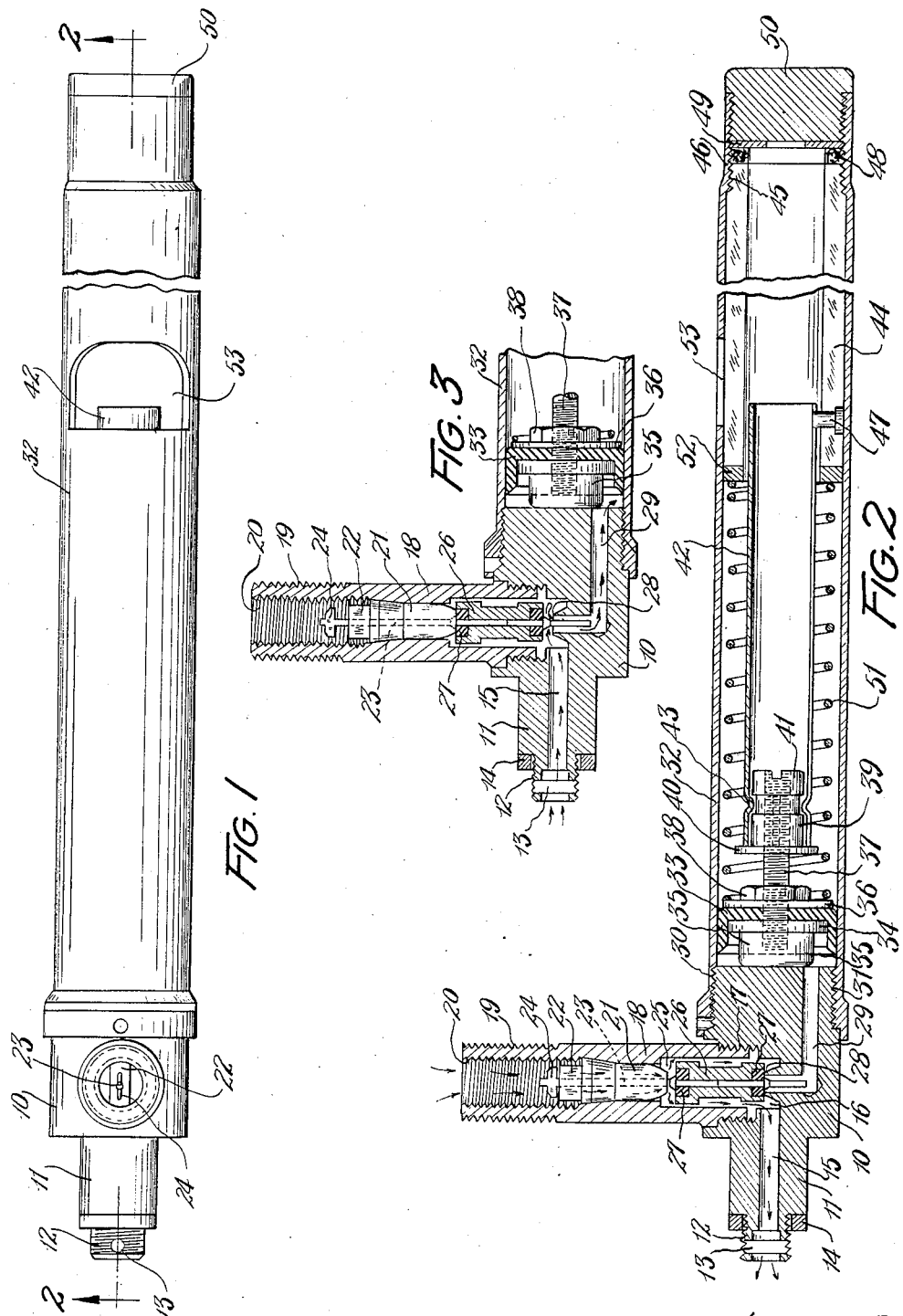
INVENTOR:
JOHN C. CROWLEY
Kwis Hudson & Kent
ATTORNEYS Patented Dec. 26, 1933

1,941,249

UNITED STATES PATENT OFFICE 1,941,249

COMBINED INFLATING DEVICE AND PRESSURE GAUGE

John C. Crowley, Cleveland Heights, Ohio, assignor to The Dill Manufacturing Company, Cleveland, Ohio, a corporation of Ohio Application October 5, 1932. Serial No. 636,376

5 Claims. (Cl. 152—11.5)

This invention relates to a combined inflating device and pressure gauge and is especially adapted to be used in the inflating of footballs, balloons, toys, and other similar articles, although it should be clearly understood that the device may be advantageously used in the inflating of many other and different kinds of articles.

An object of this invention is to provide a combined inflating device and pressure gauge which is of simple, compact, construction and is efficient and accurate in operation.

Another object is to provide a combined inflating device and pressure gauge wherein the gauge is not in communication with the device when the pressure fluid is entering the article being inflated.

A further object is to provide a combined inflating device and pressure gauge wherein the device is adapted to be coupled with a pump and is provided with valves acting during the pressure stroke of the pump to close communication between the article and gauge and open communication between the article and pump and during the suction stroke of the pump to open communication between the article and gauge and close communication between the pump and article.

Further and additional objects and advantages residing in the invention will become apparent hereinafter, during the detailed description that is to follow of an embodiment thereof.

A preferred embodiment of the invention is illustrated in the accompanying drawing, wherein Figure 1 is a top plan view of the combined inflating device and pressure gauge;

Fig. 2 is a longitudinal sectional view of the device and gauge taken approximately on line 2—2 of Fig. 1, looking in the direction of the arrows; the barrel and swivel of a valve insides used in the device being shown in elevation while the valves are disclosed as in the position they occupy during the pressure stroke of a pump attached to the device; and Fig. 3 is a fragmentary sectional view similar to Fig. 2 but showing the position of the valves during the suction stroke of the pump.

The combined inflating device and pressure gauge comprises a coupling member 10 having a reduced extension 11 provided at its end with a threaded nipple 12 adapted to be screwed into the valve stem of the article to be inflated.

The nipple 12 carries a transversely extending pin 13 which engages the valve pin of the valve insides in the stem of the article being inflated to depress the same and unseat the valve proper of the insides, as is well understood in the art. A flexible gasket 14 is externally arranged upon the nipple 12 so as to engage the end of the valve stem of the article being inflated to form an airtight seal therewith.

A passage 15 extends through the nipple 12 and extension 11 of the member 10, and communicates with a recess 16 formed in the member 10. The wall of the recess 16 is threaded as indicated at 17, to permit a valve stem 18 to be threadedly connected to the member 10, as clearly shown in Fig. 2.

The valve stem 18 is externally threaded at its outer end, as indicated at 19, adapting it to receive a threaded pump coupling and is internally threaded, as indicated at 20, to allow the swivel of a valve insides to be screwed into the same.

It is proposed to use the barrel and swivel of an ordinary valve insides in the stem 18, such barrel being indicated at 21 and having a tapered portion provided with packing cooperating with a tapered portion of the bore through the stem 18 to form an airtight seal therewith.

The swivel is indicated at 22 and, while the swivel may be of any usual form, it has been shown herein for purposes of illustration as consisting of a flat bar of considerably less thickness than length and having its opposite ends threaded to cooperate with the internal threads 20. The use of the relatively thin bar for the swivel provides adequate air passageways through the valve insides and the stem 18.

A valve pin 23 extends through the barrel 21 and an opening in the swivel 22 and is provided at its upper end with fins 24 limiting the downward movement of the pin. The lower end of the valve pin 23 extends through an enlarged portion 25 of the bore through the valve stem and through the recess 16 in the member 10.

An elongated valve member 26 is secured upon the lower end of the valve pin 23 and is provided at its opposite ends with recesses having packing 27 arranged therein and forming valves, one of which is adapted to seat on the inner end of the barrel 21 and the other of which is adapted to seat upon a valve seat 28 formed in the member 10 adjacent the inner end of the recess 16.

A passageway 29 extends through the member 10 and communicates with the recess 16 and with the pressure gauge which will now be described.

The member 10 is externally threaded as indicated at 30 to enable the internally threaded end 31 of the pressure gauge casing 32 to be screwed thereon when the device and pressure guage are assembled.

A flexible cup-shaped packing 33 forming a piston for the pressure gauge is arranged in the casing 32 and is clamped between the flange 34 of a nut 35 and a washer 36. The nut 35 is screwed upon a bolt 37 while the washer 36 is held in clamping relationship with the packing 33 by means of a nut 38 also arranged on the bolt 37.

The bolt 37 at its end opposite that on which the nut 35 is arranged, is provided with a head 39 having a laterally extending annular flange 40 at one of its ends and an annular groove 41 intermediate its ends.

A longitudinally split cylindrical sleeve 42 is positioned over the head 39 of the bolt 37 with its end engaging the flange 40 and is secured to the head 39 by depressing the sleeve into the groove 41, as indicated at 43 in Fig. 2. The sleeve 42 extends into a transparent cylinder 44, preferably formed of glass, which cylinder is externally threaded at 45 to enable it to be screwed into the reduced internally threaded end 46 of the casing 32. The cylinder 44 carries a stud 47 which extends into the longitudinal slit in the sleeve 42 and maintains said sleeve against any tendency to rotate.

Packing 48 is interposed between the outer end of the cylinder 44 and a washer 49 having a central opening therein, the washer and packing being held in position and the casing 32 being closed by a cap nut 50 screwed into the reduced internally threaded end 46.

A coil spring 51 surrounds the sleeve 42 and bears at one end on the washer 36 and at its opposite end against a washer 52 arranged in the casing 32 and engaging the inner end of the cylinder 44.

It will be seen that the gauge parts just described in detail may be assembled within the casing 32 from the inner or left hand end thereof, as viewed in the drawing, but that when the gauge is assembled upon the inflating device it will be possible to adjust the parts by removing the cap nut 50 and inserting a tool into the gauge through the opening in the washer 49.

The sleeve 42 will bear suitable indicia in terms of pounds of fluid pressure so that when the fluid pressure is admitted to the passage 29 and passes into the gauge, the piston 33 will be moved thereby against the tension of the suitably calibrated spring 51 and the sleeve 42 will move outwardly through the cylinder 44, the indicia thereon being visible through said cylinder and an opening 53 provided in the gauge casing 32, thus enabling a reading to be taken of the fluid pressure in the article being inflated.

When the valve stem of the article to be inflated is connected to the nipple 12 and a pump is connected to the externally threaded end 19 of the stem 18, the pressure stroke of the pump forces the valve member 26 inwardly until the valve packing 27 at the inner end of the member seats against the valve seat 28 and closes communication between the article and the gauge. This movement of the valve member 27 unseats the packing at its outer end with respect to the inner end of the barrel 21 and opens communication between the pump and the article, the incoming fluid pressure being thus free to pass through the stem 18, valve insides, recess 16, and passage 15, into the article, as indicated by the arrows in Fig. 2.

During the suction stroke of the pump the valve member 26 will be drawn toward the barrel 21, such movement of the member 26 being assisted by the fluid pressure in the article, once the packing 27 is unseated from the valve seat 28. This movement of the member 26 causes the packing 27 of the outer end of the member to seat against the inner end of the barrel 21 and opens communication between the article and the gauge, the pressure fluid in the article passing through the passages 15 and 29 into the gauge, as indicated by the arrows in Fig. 3. The fluid pressure passing into the gauge casing 32 causes the piston 33 and sleeve 42 to move outwardly of the casing against the tension of the spring 31 and enables a reading of the pressure in the article to be taken through the opening 53 in the casing.

It will be seen that with a combined inflating device and pressure gauge, such as just described, articles such as footballs, balloons and the like may be inflated and the fluid pressure therein constantly determined during the inflating of the same, since upon any suction stroke of the pump the gauge will be actuated to indicate the pressure.

Although a preferred embodiment of the invention has been illustrated and described herein, it should be understood that the invention is susceptible of various modifications and adaptations within the scope of the appended claims.

Having thus described my invention, I claim:

1. In a device of the character described, a member having means for connecting it with an article to be inflated, with a pump, and with a pressure gauge; said member being provided with intercommunicating passages connecting said means, and means for alternately closing or establishing communication between the article and pump and the article and gauge and controlled by the pressure and suction strokes of said pump.

2. In a device of the character described, a member having means for connecting it with an article to be inflated, with a pump, and with a pressure gauge; said member being provided with intercommunicating passages connecting said means, means within said passages forming valve seats, and valves associated with said valve seats for alternately closing or establishing communication between the article and pump and the article and gauge and controlled by the pressure and suction strokes of said pump.

3. In a device of the character described, a member having means for connecting it with an article to be inflated, with a pump, and with a pressure gauge; said member being provided with intercommunicating passages connecting said means, means within said passages forming valve seats, and interconnected valves associated with said valve seats for closing or establishing communication between the article and pump and the article and gauge and controlled by the pressure and suction strokes of said pump.

4. In a device of the character described, a member having means for connecting it with an article to be inflated and with a pressure gauge and provided with intercommunicating passages connecting said means, said member being provided with a valve seat at the junction of said passages, a valve stem adapted to be connected to a pump associated with said member and in communication with said passages and having a valve seat arranged therein, and a valve pin arranged in said stem and having mounted thereon a valve adapted to seat on said first named seat and a valve adapted to seat upon said second named seat, the seating and unseating of said valves being alternately effected by the strokes of the pump.

5. In a device of the character described, a member having means for connecting it with an article to be inflated and with a pressure gauge and provided with intercommunicating passages connecting said means, said member being provided with a valve seat at the junction of said passages, a valve stem adapted to be connected to a pump and associated with said member and in communication with said passages, a valve insides in said stem and including a valve seat and a valve pin, said pin being provided with valves adapted to seat alternately upon the valve seat of said valve insides and upon said first named valve seat, said valves being controlled by the strokes of said pump.

JOHN C. CROWLEY.